United States Patent [19]
Neeley

[11] Patent Number: 5,802,679
[45] Date of Patent: Sep. 8, 1998

[54] CIRCULAR CLEAT APPARATUS

[76] Inventor: Michael Joseph Neeley, 2039 Rose Hill, Carrollton, Tex. 75007

[21] Appl. No.: 838,276

[22] Filed: Apr. 16, 1997

[51] Int. Cl.[6] .................................................. F16G 11/00
[52] U.S. Cl. ............................................................ 24/130
[58] Field of Search ........................ 24/18, 712.9, 129 R, 24/130, 127, 129 A, 129 D, 115 J; 114/218

[56] References Cited

U.S. PATENT DOCUMENTS

| | | | |
|---|---|---|---|
| 83,075 | 10/1868 | McMaster | 24/115 J X |
| 516,555 | 3/1894 | Smith | 24/129 R |
| 1,470,261 | 10/1923 | Harrington | 24/130 X |
| 1,932,389 | 10/1933 | Wilson | 24/127 |
| 2,202,968 | 6/1940 | Simler | 24/127 |
| 3,398,714 | 8/1968 | Wallin et al. | 24/130 X |
| 4,340,998 | 7/1982 | Liberge | 24/130 |
| 5,230,295 | 7/1993 | Shell | 24/159 R X |
| 5,522,120 | 6/1996 | Brinning | 24/130 |
| 5,596,791 | 1/1997 | Parsons | 24/130 |

*Primary Examiner*—James R. Brittain
*Attorney, Agent, or Firm*—Karl Larson; Renee Michelle Larson

[57] ABSTRACT

A circular cleat apparatus allows a user to quickly and easily adjust in both directions the length and tension of an elongated cord. The circular cleat apparatus employs a circular cleat where a portion of the circular cleat provide engaging members to grip the elongated cord. The other half of the circular cleat is smooth. The elongated cord is guided through a rope guide on the circular cleat and positioned between the lateral walls of the circular cleat to provide a simple positive anchor. The circular cleat could be used alone simply for the purpose of securing ropes, bungie cords, and similarly configured flexible elongated cords or to tightening elongated cords together.

26 Claims, 3 Drawing Sheets

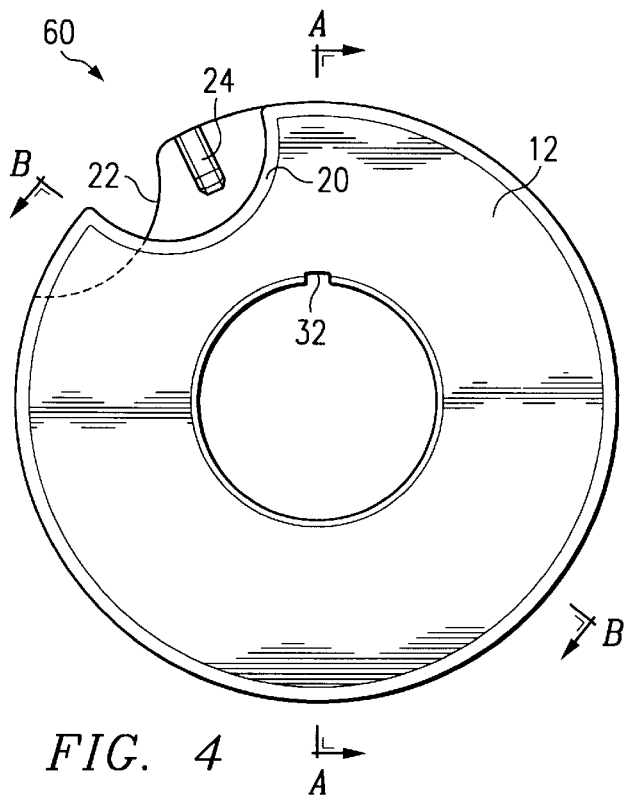
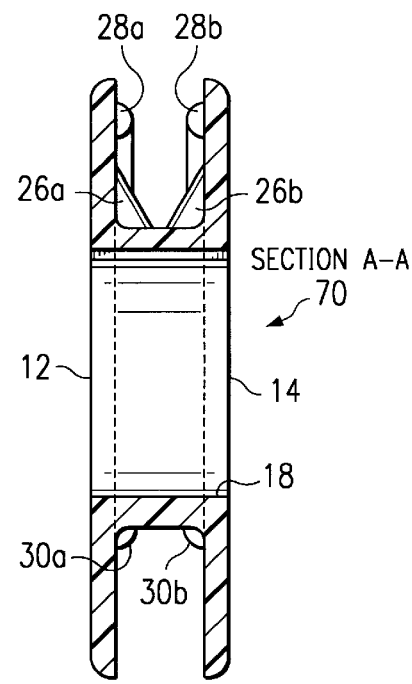
FIG. 4
FIG. 5
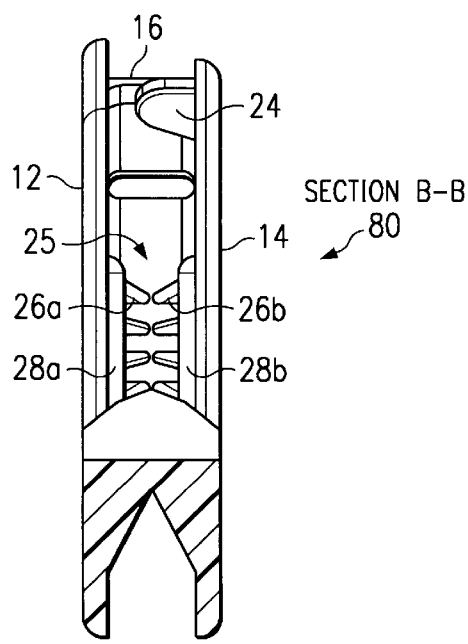
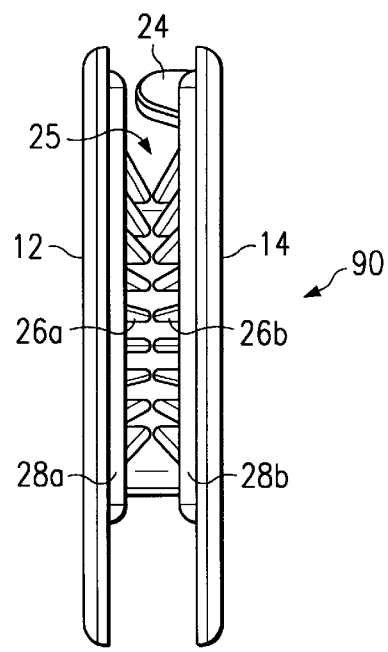
FIG. 6
FIG. 7

SECTION B-B
120

CIRCULAR CLEAT APPARATUS

FIELD OF THE INVENTION

The present invention relates generally to a friction fastening apparatus and more specifically to an apparatus employing a circular cleat that fastens an elongated cord using frictional engagement.

BACKGROUND OF THE INVENTION

It is often desirable to use elongated cords in combination with a fastener to secure items to a structure or to other items. Devices used to fasten elongated cords have utilized linear cleating or friction to hold the elongated cord on to the fastening device. The use of cleats to hold elongated cords in place has been around for centuries. They have been particularly suited for sailing vessels and other nautical uses. For instance, ropes connected to a securing mechanism on sailboats have traditionally been used to secure the hull of the sailboat to its sail. In the exercise environment, elongated cords in combination with a fastener have been used to provide resistance for exercise equipment.

Hereinafter the word "elongated cord" will be used to denote articles such as ropes, cords, lines, leather, or bungie cords. Articles such as rope, leather, rubber, bungie cords and the like have been used as elongated cords in combination with a fastener in the prior art. The effectiveness of the material often varies depending on the material and the application of its use.

Fasteners known in the prior art include mechanical locks or mechanical buckles, where the flexible elongated cord is inserted into and secured between the mechanical fastener. Other types of fasteners used in combination with an elongated cord include hoops and locks, such as VELCRO, or tying the elongated cord in a knot. Many of these fasteners are expensive to produce thus increasing the cost of the securing mechanism. Many of the fasteners also require several steps that must be performed to fasten the elongated cord to the securing mechanism. These steps increase the time required to initially fasten the elongated cord to the securing mechanism as well as the time required to periodically adjust the length and tension of the elongated cord. Additionally, many of the fasteners employ complex systems to secure the elongated cord to the securing mechanism, thereby increasing the possibility of a fastener malfunction.

Typical securing mechanisms function by wedging an elongated cord between two constricting members to secure the elongated cord from slipping. The cleat itself was directly secured with screws or nails or it had to have a hook at one end to allow it to be secured to another member. In many cases the securing mechanism can cause damage to the elongated cord with repeated use. Many of the devices in the prior art have done an adequate job of holding elongated cords in place but have done so at the risk of fraying or damaging the elongated cords that they were designed to hold.

In the field of athletic equipment shock cords or elastic cords are commonly used to achieve resistance when performing exercises. Owing to the variation in the size and skill level of the individuals using these devices, the elongated cords need to be made adjustable to different lengths of cord. Traditional securing mechanisms to secure an elongated cord are not easily adjustable and the adjustment feature cannot be performed with only one hand on the elongated cord itself. Securing mechanisms have not allowed easy one handed adjustment or other easy adjustment of an elongated cord. Traditional securing mechanisms have used different lengths of elongated cord to achieve this adjustment feature or they have used complicated or cumbersome methods of attachment. Other fastening devices have utilized a hook that extends off of one end of the elongated cord to allow for attachment to an object. These hooks have been known to be damaging to the equipment or dangerous if they slip out of ones hand while trying to adjust the elongated cord. Additionally, many fastening devices have been unable to make elastic cords fasten to the securing mechanism while at the same time allowing for adjustments to the length of the cords.

As other uses and needs for cleating have arisen, the usefulness of the cleat in its prior art form has become inadequate. Therefore, it would be desirable in the art to provide a simple low-cost fastener using frictional engagement that allows a user to quickly and easily adjust in both directions the length and tension of an elongated cord. It would also be desirable in the art for the adjustment to be capable of being performed using one hand. There is thus an unmet need in the art for an apparatus that allows an elongated cord to be quickly and easily adjusted.

SUMMARY AND OBJECTS OF THE INVENTION

It would be advantageous in the art to provide a fastener that allows a user to quickly release an elongated cord.

It would be advantageous in the art to provide a fastener that allows a user to quickly and easily adjust in both directions the length and tension of an elongated cord.

It would be advantageous in the art to provide a fastener that allows a user to adjust in both directions to shorten or lengthen the length of an elongated cord with one hand.

It would be advantageous in the art to provide a fastener with several means of attachment to a surface.

Therefore, according to the present invention, a circular cleat apparatus allows a user to easily fasten an elongated cord using frictional engagement. A circular cleat is employed in which a portion of the circular cleat provides engaging members to grip and hold the elongated cord and another portion of the circular cleat provides frictional retention on a smooth radius. This arrangement provides more frictional surface area to the elongated cord that is to be secured and allows for a dissipation of the force of resistance to be spread over an arc providing for a greater surface area for frictional engaging members than is possible with a linear cleat. The elongated cord is guided through a rope guide of the circular cleat and positioned between the lateral walls of the circular cleat to provide a simple positive anchor. The circular cleat apparatus allows a user to quickly and easily adjust in both directions the length and tension of an elongated cord. The circular cleat also includes a perimeter lip that contributes to the ease of rapid one-handed adjustments. The circular cleat contains a locking member that allows the present invention to be locked to an exterior structure by mating the locking member with a matching protrusion of the exterior structure, such as a bar or other member, to which the present invention is intended to be secured thereby eliminating circular movement. An alternate embodiment of the invention describes a hook member extending from the circular cleat suitable for securing the circular cleat to a surface.

It is accordingly an object of the invention to provide a fastener that allows a user to quickly release an elongated cord.

It is yet another object of the invention to provide a fastener that allows a user to quickly and easily adjust in both directions the length and tension of an elongated cord.

It is another object of the invention to provide a fastener that allows a user to adjust in both directions to shorten or lengthen the length of an elongated cord with one hand.

It is yet another object of the invention to provide a fastener with several means of attachment to a surface.

These and other objects of the invention will become apparent from the detailed description of the invention in which numerals used throughout the description correspond to those found in the drawing figures.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 4 is a top view of the circular cleat apparatus, according to the present invention;

FIG. 5 is a cutaway cross-sectional view along the "A—A" axis of the circular cleat apparatus, according to the present invention;

FIG. 6 is a cutaway cross-sectional view along the "B—B" axis of the circular cleat apparatus, according to the present invention;

FIG. 7 is a side view of the circular cleat apparatus showing the engaging members, according to the present invention;

DESCRIPTION OF THE INVENTION

Figure 1:
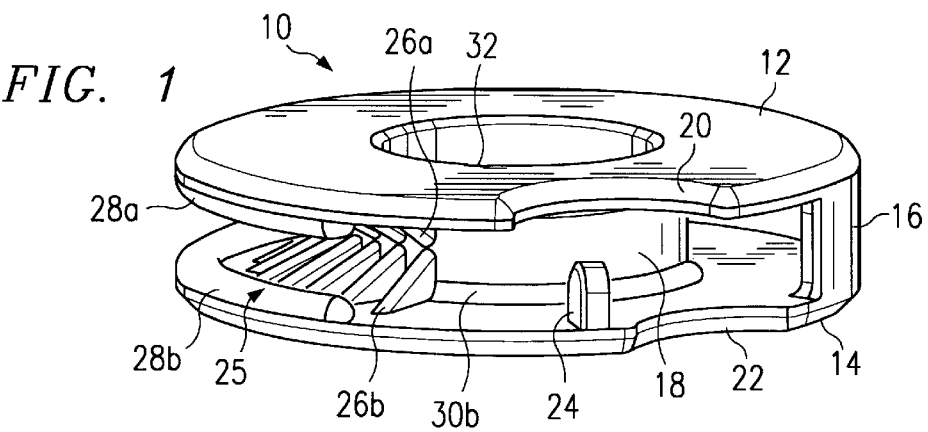
FIG. 1 is a first perspective view of the circular cleat apparatus, according to the present invention.

The present invention describes a fastener for an elongated cord using frictional engagement. The fastener employs a circular cleat that is configured to allow a user to quickly and easily adjust in both directions the length and tension of the elongated cord. The circular design of the circular cleat incorporates a smooth area and an engaging area for retention of an elongated cord. The smooth area provides a smooth surface retention similar to the retention of wrapping an elongated cord around a rod. This dissipates the effect of the force over the radius of the circular cleat. The engaging area provides teeth on the internal lateral walls of the circular cleat that allow for the cinching of the elongated cord between the teeth. It is the combination of these two surfaces and their location on the radius of the circular cleat that enhances the retention of an elongated cord that is to be secured. This arrangement provides more frictional surface area to the elongated cord that is to be secured and allows for a dissipation of the force of resistance to be spread over an arc. It also provides a greater surface area for the engaging members in a smaller area than is possible with a linear cleat.

The present invention allows the use of elongated cords to be cleated or fastened allowing for ready adjustments to the length of the elongated cords. The design of the circular cleat makes the use of adjustable elongated cords more easily achievable. It also addresses the potential problem of the elongated cord slipping out of a users hand while the user is trying to adjust the cord with the use of a hole through the middle of the body that allows for a bar or a member to which the attachment is intended to be fastened. The elongated cord is shaped in a circular fashion around the circular cleat apparatus which allows for easy one-handed adjustments of the elongated cord.

In the present invention, a portion of the circular cleat provides engaging members to grip the elongated cord and thus to provide a simple positive anchor for fastening the elongated cord. Another portion of the circular cleat is smooth. An elongated cord is guided through a rope guide on the circular cleat and positioned between the lateral walls of the circular cleat. The present invention embodies a perimeter lip and an extension that has the function of holding the elastic cord against the engaging members of the cleat itself. The perimeter lip design also contributes to the ease of rapid one-handed adjustments. The present invention could be used alone simply for the purpose of securing ropes, bungie cords, and similarly configured flexible elongated cords or for the purpose of tightening elongated cords together. The configuration of the present invention provides a better way to easily adjust elongated cords over the prior art.

The present invention provides an important advantage over the prior art in that it allows a user to quickly and easily adjust the length and tension of an elongated cord. It adjusts in both directions, allowing the rope or cord attached to the circular cleat apparatus to be quickly loosened. A user may adjust the length of a rope or cord attached to the circular cleat with one hand. Additionally, the present invention addresses the potential problem of the elongated cord slipping out of a users hand while the user is trying to adjust the cord.

Figure 2:
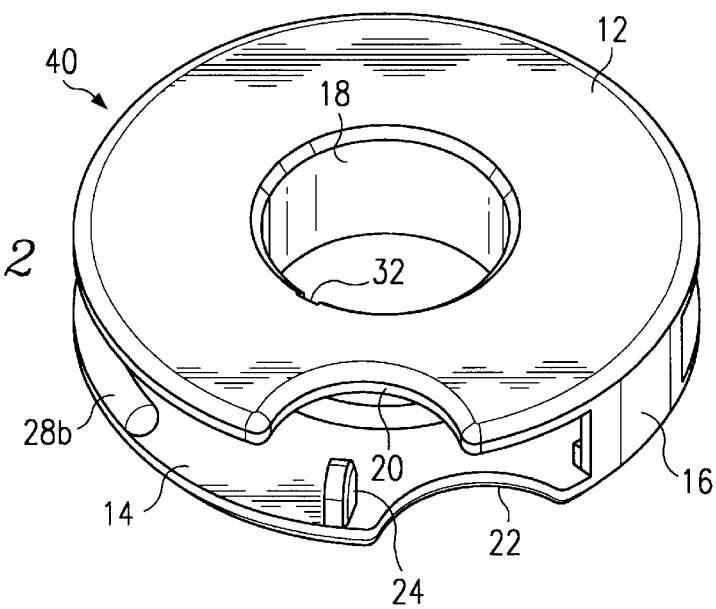
FIG. 2 is a second perspective view of the circular cleat apparatus, according to the present invention.
Figure 3:
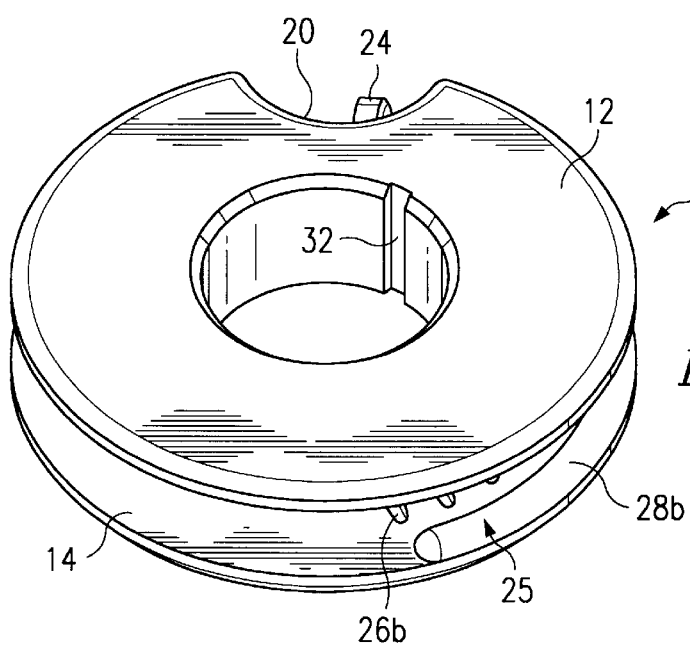
FIG. 3 is a third perspective view of the circular cleat apparatus, according to the present invention.

Three perspective views of the circular cleat apparatus of this invention, indicated by reference numerals 10, 40, and 50, respectively, are shown in FIGS. 1–3. The circular cleat apparatus includes an upper circular member 12, a lower circular member 14, an inner circular adjoining member 18, an engaging member 25, a guide member 16, and a retaining member 24. Inner circular adjoining member 18 interconnects upper circular member 12 and lower circular member 14. Upper circular member 12 is positioned parallel to lower circular member 14 as shown.

Engaging member 25 is seated between the upper circular member 12, the inner circular adjoining member 18, and the lower circular member 14. Engaging member 25 includes an plurality of upper engaging pieces 26a and a plurality of lower engaging pieces 26b. Each of the upper engaging pieces 26a are right-angle triangular in shape with the height of the triangle abutting the inner circular adjoining member 18; the length of the triangle abutting the upper circular member 12; and the hypotenuse of the triangle starting at a point on the inner surface of upper circular member 12 and terminating at a point on the inner circular adjoining member 18 between the upper circular member 12 and the lower circular member 14, as shown in the drawing. Each of the lower engaging pieces 26b are right-angle triangular in shape with the height of the triangle abutting the inner circular adjoining member 18; the length of the triangle abutting the lower circular member 14; and the hypotenuse of the triangle starting at a point on the inner surface of lower circular member 14 and terminating at a point on the inner circular adjoining member 18 between the lower circular member 14 and the upper circular member 12, as shown in the drawing. Each of the upper engaging pieces 26a is operatively aligned with a corresponding lower engaging piece 26b. Alternatively, the upper engaging pieces 26a may be offset from the lower engaging pieces 26b in any relationship so long as engaging member 25 operates to engage the elongated cord.

Upper circular portion 12 includes a semi-circular cutout 20 positioned on the outer perimeter portion of the upper circular member 12. Lower circular portion 14 similarly includes a semi-circular cutout 22 positioned on the outer perimeter portion of the lower circular member 14. The diameter of semi-circular cutout 22 is smaller than the diameter of semi-circular cutout 20. As can be seen from FIG. 2, semi-circular cutout 20 is offset from semi-circular cutout 22.

Guide member 16 connects an outer perimeter portion of the upper circular member 12 to an outer perimeter portion of the lower circular member 14. An elongated cord is guided through guide member 16 to secure the elongated cord to the present invention.

Retaining member 24 is seated at the outer perimeter portion of the lower circular member 14. Retaining member 24 extends vertically from the inner surface of the lower circular member 24 towards the midpoint of the semi-circular cutout 20 of the upper circular member 12.

As best seen from FIG. 3, the inner circular adjoining member 18 contains a locking member 32. Locking member 32 is a cutout of an interior surface of the inner circular adjoining member 18 extending along the axis. Locking member 32 allows the present invention to be locked to an exterior structure by mating locking member 32 with a matching protrusion of the exterior structure, such as a bar or other member, to which the present invention is intended to be secured thereby eliminating circular movement along the axis.

Referring to FIG. 4, a top view of the circular cleat apparatus 60 is shown. Semi-circular cutout 22 of the lower circular member 14 is positioned on the outer perimeter portion of the lower circular member 14 in an offset relationship to the semi-circular cutout 20 of the upper circular member 12.

As best seen from FIG. 5, a cut-away cross-sectional view along the "A—A" axis of the circular cleat apparatus 70, upper interior lip member 30a is seated along a portion of the circumference of the inner surface of the upper circular member 12 and the inner circular adjoining member 18. Lower interior lip member 30b is seated along a portion of the circumference of the inner surface the lower circular member 14 and the inner circular adjoining member 18. Upper circular portion 12 includes a perimeter lip member 28a positioned on the outer perimeter portion of the upper circular member 12. Lower circular portion 14 includes a perimeter lip member 28b positioned on the outer perimeter portion of the lower circular member 14.

Referring to FIG. 6, a cut-away cross-sectional view along the "B—B" axis of the circular cleat apparatus 80 is shown. Each of the upper engaging pieces 26a angles towards the perimeter of the upper circular member 12 and each of the lower engaging pieces 26b angles towards the perimeter of the upper circular member 12 to form an engaging surface for an elongated cord therebetween.

Figure 8:
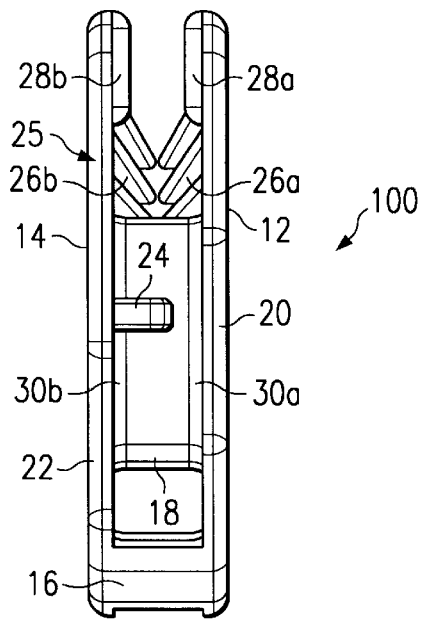
FIG. 8 is a oblique view showing the interior portions of the circular cleat apparatus, according to the present invention.

Referring to FIG. 7, a side view of the circular cleat apparatus showing the engaging members of the circular cleat apparatus 90 is shown. The relationship between the plurality of upper engaging pieces 26a and the plurality of lower engaging pieces 26b can clearly be seen. Referring to FIG. 8, a oblique view showing the interior portions of the circular cleat apparatus 100 is shown.

Figure 10:
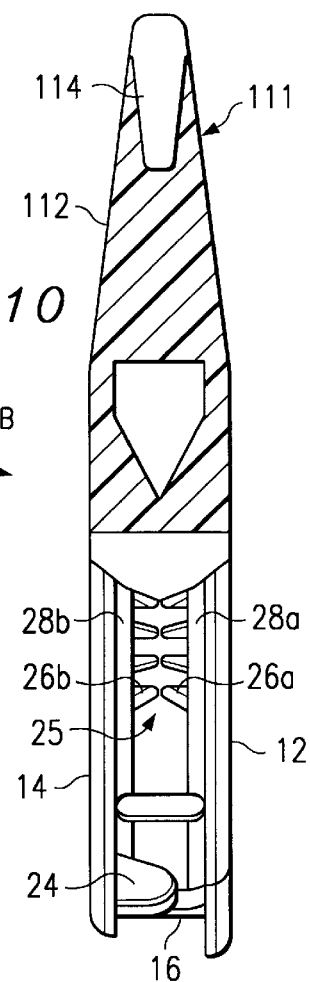
FIG. 10 is a cutaway cross-sectional view along the "B—B" axis of the circular cleat apparatus, according to the alternate embodiment of the present invention.
Figure 9:
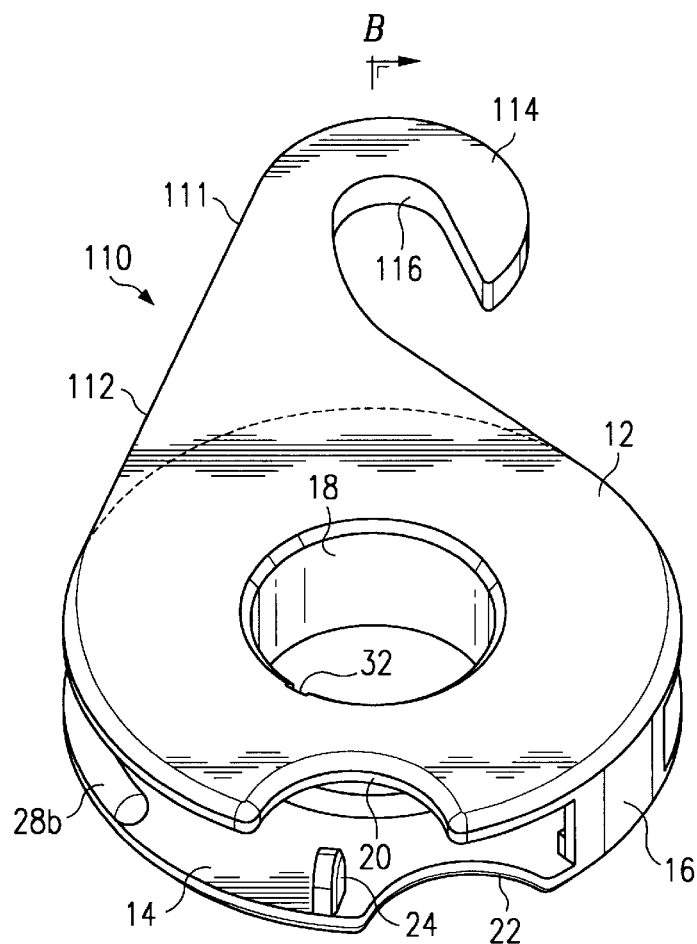
FIG. 9 is a perspective view of the circular cleat apparatus, according to an alternate embodiment of the present invention.

Referring to FIG. 9, a perspective view according to an alternate embodiment of circular cleat apparatus 110 is shown. Circular cleat apparatus 110 is similar to the above-described circular cleat apparatus but additionally comprises a hook member 111. Hook member 111 comprises an extending portion 112 and a hook portion 114 having an interior surface 116. Extending portion 112 extends away from the main body of circular cleat 110 as shown in the figure. Another view of hook member 111 is illustrated in FIG. 10. Referring to FIG. 10, a cut-away cross-sectional view along the "B—B" axis of FIG. 9 according to the alternate embodiment of circular cleat apparatus 120 is shown.

The circular cleat apparatus with hook member offers the advantage of providing a ready means for attaching the circular cleat to another surface. For instance, the hook member 111 could be secured in a "hook and eye" arrangement by threading the hook portion 114 through a hole or "eye" of a surface to which the circular cleat is to be secured.

While the invention has been particularly shown and described with reference to a preferred embodiment, it will be understood by those skilled in the art that various changes in form and detail may be made therein without departing from the spirit and scope of the invention. The dimensions used in the above mentioned figures are merely an example and may be varied without departing from the spirit and scope of the invention.

What is claimed is:

1. A fastening device, comprising:

a lower circular member having an inner surface, a perimeter, and a semi-circular cutout positioned on a first portion of the perimeter;

an upper circular member having an inner surface, a perimeter, and a semi-circular cutout positioned on a first portion of the perimeter, wherein the upper circular member is positioned parallel to the lower circular member;

an inner circular adjoining member interconnecting the upper circular member and the lower circular member;

an engaging member for engaging an elongated cord within the fastening device operatively connecting the upper circular member, the inner circular adjoining member, and the lower circular member and having a plurality of upper engaging pieces and a plurality of lower engaging pieces, wherein the upper engaging pieces are physically connected to the inner surface of the upper circular member and the inner circular adjoining member and the lower engaging pieces are physically connected to the inner surface of the lower circular member and the inner circular adjoining member; and a guide member connecting a second portion of the perimeter of the lower circular member and a second portion of the perimeter of the upper circular member.

2. The fastening device of claim 1, wherein the lower circular member includes a perimeter lip member positioned on the inner surface and a third portion of the perimeter of the lower circular member and wherein the upper circular member includes a perimeter lip member positioned on the inner surface and a third portion of the perimeter of the upper circular member.

3. The fastening device of claim 2, wherein the semi-circular cutout of the upper circular member is operatively aligned in an offset relationship with the semi-circular cutout of the lower circular member.

4. The fastening device of claim 3, wherein the diameter of the semi-circular cutout of the upper circular member is smaller than the diameter of the semi-circular cutout of the lower circular member.

5. The fastening device of claim 4, wherein the inner circular adjoining member includes an interior surface defining a circular bore chamber extending therethrough the inner circular adjoining member configured for receiving an exterior structure therebetween the interior surface.

6. The fastening device of claim 5, wherein the inner circular adjoining member additionally includes a locking member that is a cutout of the interior surface of the inner circular adjoining member extending along the axis of the inner circular adjoining member and wherein the locking member is configured for receiving a protrusion on the exterior structure thereby securing the fastening device to the exterior structure.

7. A fastening device, comprising:
   a lower circular member having an inner surface, a perimeter, and a semi-circular cutout positioned on a first portion of the perimeter, wherein the lower circular member includes a perimeter lip member positioned on the inner surface and a second portion of the perimeter of the lower circular member;
   an upper circular member having an inner surface, a perimeter, and a semi-circular cutout positioned on a first portion of the perimeter, wherein the upper circular member is positioned parallel to the lower circular member and wherein the upper circular member includes a perimeter lip member positioned on the inner surface and a second portion of the perimeter of the upper circular member;
   an inner circular adjoining member interconnecting the upper circular member and the lower circular member;
   an engaging member for engaging an elongated cord within the fastening device operatively connecting the upper circular member, the inner circular adjoining member, and the lower circular member and having a plurality of upper engaging pieces and a plurality of lower engaging pieces, wherein the upper engaging pieces are physically connected to the inner surface of the upper circular member and the inner circular adjoining member and the lower engaging pieces are physically connected to the inner surface of the lower circular member and the inner circular adjoining member;
   a retaining member positioned on the perimeter of the lower circular member extending vertically from the inner surface of the lower circular member towards the upper circular member; and
   a guide member connecting a third portion of the perimeter of the lower circular member and a third portion of the perimeter of the upper circular member.

8. The fastening device of claim 7, wherein the semi-circular cutout of the upper circular member is operatively aligned in an offset relationship with the semi-circular cutout of the lower circular member.

9. The fastening device of claim 8, wherein the retaining member is positioned on the perimeter of the lower circular member extending vertically from the inner surface of the lower circular member towards the midpoint of the semi-circular cutout on the upper circular member and wherein the perimeter of the semi-circular cutout of the lower circular member begins at the retaining member on the lower circular member.

10. The fastening device of claim 9, wherein the diameter of the semi-circular cutout of the lower circular member is smaller than the diameter of the semi-circular cutout of the upper circular member.

11. The fastening device of claim 7, wherein each of the upper engaging pieces of the plurality of upper engaging pieces are right-angle triangular in shape and wherein each of the lower engaging pieces of the plurality of lower engaging pieces are right-angle triangular in shape.

12. The fastening device of claim 11, wherein each of the upper engaging pieces of the plurality of upper engaging pieces are operatively aligned with a corresponding lower engaging piece of the plurality of lower engaging pieces.

13. The fastening device of claim 12, wherein each of the upper engaging pieces having a first side abutting the inner surface of the upper circular member, a second side abutting the inner circular adjoining member, and a third side extending from the inner surface of the upper circular member to the inner circular adjoining member.

14. The fastening device of claim 12, wherein each of the lower engaging pieces having a first side abutting the inner surface of the lower circular member, a second side abutting the inner circular adjoining member, and a third side extending from the inner surface of the lower circular member to the inner circular adjoining member.

15. A fastening device, comprising:
   a lower circular member having an inner surface, a perimeter, and a semi-circular cutout positioned on a first portion of the perimeter, wherein the lower circular member includes a perimeter lip member positioned on the inner surface and a second portion of the perimeter of the lower circular member;
   an upper circular member having an inner surface, a perimeter, and a semi-circular cutout positioned on a first portion of the perimeter, wherein the upper circular member is positioned parallel to the lower circular member and wherein the upper circular member includes a perimeter lip member positioned on the inner surface and a second portion of the perimeter of the upper circular member;
   an inner circular adjoining member interconnecting the upper circular member and the lower circular member, wherein the inner circular adjoining member includes an interior surface defining a circular bore chamber extending therethrough the inner circular adjoining member configured for receiving an exterior structure therebetween the interior surface;
   a locking member that is a cutout of the interior surface of the inner circular adjoining member extending along the axis of the inner circular adjoining member and wherein the locking member is configured for receiving a protrusion on the exterior structure thereby securing the fastening device to the exterior structure;
   an engaging member for engaging an elongated cord within the fastening device operatively connecting the upper circular member, the inner circular adjoining member, and the lower circular member and having a plurality of upper engaging pieces and a plurality of lower engaging pieces, wherein the upper engaging pieces are physically connected to the inner surface of the upper circular member and the inner circular adjoining member and the lower engaging pieces are physically connected to the inner surface of the lower circular member and the inner circular adjoining member;

a guide member connecting a third portion of the perimeter of the lower circular member and a third portion of the perimeter of the upper circular member;

a retaining member positioned on the perimeter of the lower circular member extending vertically from the inner surface of the lower circular member towards the upper circular member;

an upper interior lip, wherein the upper interior lip member is seated along a portion at the intersection between the inner surface of the upper circular member and the inner circular adjoining member; and a lower interior lip, wherein the lower interior lip member is seated along a portion at the intersection between the inner surface of the lower circular member and the inner circular adjoining member.

16. The fastening device of claim 15, wherein the semi-circular cutout of the upper circular member is operatively aligned in an offset relationship with the semi-circular cutout of the lower circular member.

17. The fastening device of claim 16, wherein the retaining member is positioned on the perimeter of the lower circular member extending vertically from the inner surface of the lower circular member towards the midpoint of the semi-circular cutout on the upper circular member and wherein the perimeter of the semi-circular cutout of the lower circular member begins at the retaining member on the lower circular member.

18. The fastening device of claim 17, wherein the diameter of the semi-circular cutout of the lower circular member is smaller than the diameter of the semi-circular cutout of the upper circular member.

19. The fastening device of claim 15, wherein each of the upper engaging pieces of the plurality of upper engaging pieces are right-angle triangular in shape and wherein each of the lower engaging pieces of the plurality of lower engaging pieces are righ-tangle triangular in shape.

20. The fastening device of claim 19, wherein each of the upper engaging pieces of the plurality of upper engaging pieces are operatively aligned with a corresponding lower engaging piece of the plurality of lower engaging pieces.

21. The fastening device of claim 20, wherein each of the upper engaging pieces having a first side abutting the inner surface of the upper circular member, a second side abutting the inner circular adjoining member, and a third side extending from the inner surface of the upper circular member to the inner circular adjoining member.

22. The fastening device of claim 20, wherein each of the lower engaging pieces having a first side abutting the inner surface of the lower circular member, a second side abutting the inner circular adjoining member, and a third side extending from the inner surface of the lower circular member to the inner circular adjoining member.

23. A fastening device, comprising:

a lower circular member having an inner surface, a perimeter, and a semi-circular cutout positioned on a first portion of the perimeter;

an upper circular member having an inner surface, a perimeter, and a semi-circular cutout positioned on a first portion of the perimeter, wherein the upper circular member is positioned parallel to the lower circular member;

an inner circular adjoining member interconnecting the upper circular member and the lower circular member;

an engaging member for engaging an elongated cord within the fastening device operatively connecting the upper circular member, the inner circular adjoining member, and the lower circular member and having a plurality of upper engaging pieces and a plurality of lower engaging pieces, wherein the upper engaging pieces are physically connected to the inner surface of the upper circular member and the inner circular adjoining member and the lower engaging pieces are physically connected to the inner surface of the lower circular member and the inner circular adjoining member;

a guide member connecting a second portion of the perimeter of the lower circular member and a second portion of the perimeter of the upper circular member; and a hook member having an extending portion and a hook portion, wherein the hook portion has a curved interior surface suitable for securing the fastening device to a surface.

24. The fastening device of claim 23, wherein the lower circular member includes a perimeter lip member positioned on the inner surface and a third portion of the perimeter of the lower circular member and wherein the upper circular member includes a perimeter lip member positioned on the inner surface and a third portion of the perimeter of the upper circular member.

25. The fastening device of claim 24, further comprising:

a retaining member positioned on the perimeter of the lower circular member extending vertically from the inner surface of the lower circular member towards the upper circular member.

26. The fastening device of claim 25, further comprising:

a locking member that is a cutout of the interior surface of the inner circular adjoining member extending along the axis of the inner circular adjoining member and wherein the locking member is configured for receiving a protrusion on the exterior structure thereby securing the fastening device to the exterior structure.

* * * * *